(12) United States Patent
Lieberman et al.

(10) Patent No.: US 8,040,568 B2
(45) Date of Patent: Oct. 18, 2011

(54) 4+ COLOR MANAGEMENT USING A VIRTUAL CMYK COLOR PARADIGM

(75) Inventors: David J. Lieberman, Fairport, NY (US); Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 770 days.

(21) Appl. No.: 12/135,546

(22) Filed: Jun. 9, 2008

(65) Prior Publication Data
US 2009/0303556 A1 Dec. 10, 2009

(51) Int. Cl.
*H04N 1/46* (2006.01)
*H04N 1/40* (2006.01)

(52) U.S. Cl. ....... 358/3.21; 358/3.01; 358/504; 358/518

(58) Field of Classification Search .............. 358/1.9, 358/2.1, 3.01, 3.06, 3.21, 3.24, 515, 517, 358/518, 504
See application file for complete search history.

(56) References Cited

U.S. PATENT DOCUMENTS

| | | | |
|---|---|---|---|
| 5,960,161 A * | 9/1999 | Bloomberg et al. ........... | 358/1.9 |
| 2005/0116975 A1 * | 6/2005 | Kasai ............................ | 347/10 |
| 2007/0139526 A1 * | 6/2007 | Parulski et al. ........ | 348/207.99 |

OTHER PUBLICATIONS

Braverman et al., "Hue Preserving Aspects of CYMK—CYMKcm Color Transformations", ICIS '06, Int'l Congress of Image Science, May 7-11, 2006, pp. 637-640.

* cited by examiner

*Primary Examiner* — James A Thompson
(74) *Attorney, Agent, or Firm* — Oliff & Berridge, PLC

(57) ABSTRACT

A color management method, system and storage medium output 4+ color separation signals to a 4+ (5 or more) color print engine. An input source color is converted into virtual intermediate CMYK separation signals using a 4-color management tool, which may be a conventional tool. These virtual intermediate CMYK separation signals are received as input within a digital front end (DFE), which transforms the intermediate signals into 4+ separation signals, such as for a 6-color print engine. A transformation unit of the DFE passes some of the input separation signals through directly as output (without transformation) while transforming others by splitting them into light and dark separation signals, such as light and dark cyan or magenta using a blend curve that will output the same tonal quality. The transformation unit may use a blending curve that takes into account ink-limit constraints and may maximize light colorant usage to improve image smoothness in light image regions.

18 Claims, 8 Drawing Sheets

4+ COLOR MANAGEMENT USING A VIRTUAL CMYK COLOR PARADIGM

BACKGROUND

The disclosure relates to systems and methods that provide 4+ color management for printers by leveraging 4-color management tools.

Printing systems includes an input module, sometimes referred to a digital front end (DFE). An objective of a DFE is to achieve a desired appearance at every point on a document. This desired appearance has been described in terms of a 3-dimensional uniform color space using perceptual dimensions $L^*$, $a^*$, and $b^*$. The use of more than three final marking colors indicates redundancy. Using conventional 4-color management tools, the strategy for coping with this redundancy is called gray color removal (OCR). Managing this redundancy is one of the most challenging aspects of the task. However, machines that have more than four colors, such as 6-color printers, have increased complexity in management due to the complexity associated with the additional redundancy.

Many tools and techniques have matured over an extended period to manage color on a 4-color printing system, such as a CMYK print engine. However, machines that employ more than 4 colors have greater levels of redundancy and will require new tools of greater complexity.

Related tool development of this kind has been developed to support 6-color products. In one example, a conventional CMYK solution is followed by an algorithm that attempts to preserve hue while mapping CMYK to CMYKcm (Ref. Gregory Braverman, et al, "Hue Preserving Aspects of CMYK-CMYKcm Color Transformations", ICIS '06, Intl. Congress of Image Science. May 7-11, 2006, pp. 637-640). In this article, a good 4-color actual solution is mapped into a 6-color solution that degrades the color quality as little as possible, minimizing color error and contouring while blending in the new colors. These complex tools are the result of an extended research effort that is described in the literature, but suffer from large development costs and time delays associated with the development cycle of a completely new color management tool that is expanded beyond four color printing.

SUMMARY

Besides the large development costs and time delays associated with the development cycle of a completely new color management tool, other challenging complexities exist for many printer architectures, such as ink-limit constraints, which are further challenged by the addition of the extra colorants in the color management.

Considering the availability of commercially available quality 4-color color management tools, such as Xerox's CTK (Color Tool Kit), and other DFE color management tools it would be desirable to be able to leverage such existing tools to quickly, yet efficiently, address these new color management tasks.

In accordance with aspects of the disclosure, existing 4-color color management tools are leveraged to solve 6-color management tasks. In exemplary embodiments, this may be achieved by making a portion of the 6-color problem reducible to a 4-color problem using a virtual 4-color printer (V4CP) approach. First, conventional color management tools and procedures may be used to produce destination-dependent 4-color output, such as CMYK output. These 4 colors may then be used as an intermediary, and partitioned into two parts. A first part can be used directly as input to the 6-color printer. The other part may be substituted with other color separations based on a subsequent 'color-splitting' solution. This 'color splitting' task exploits information contained within the intermediary CMYK. In this way, a potentially challenging 6-color management task is partitioned into two much easier tasks to achieve highly optimized results.

In accordance with aspects of the disclosure, existing 4-color tools are exploited to achieve a partial solution, which includes GCR. The remaining portion of the task can be handled separately using a subsequent mapping.

In accordance with aspects of the invention, a 5 or more (4+) color management system for outputting 5 or more (4+) color separation signals to a 5 or more (4+) color print engine is provided. The system includes: a 4-color management unit that converts an input source color into intermediate CMYK separation signals; and a 4+ color transformation unit within the color management system that receives the intermediate CMYK separation signals as input and outputs at least 5 output color separation signals for reception by a 4+ color print engine. The 4+ color transformation unit passes at least one of the input separation signals through as output without transformation, and transforms at least one different input separation signal into two or more separate output color separation signals that collectively have a same tonal quality. One of the two or more separate output color separation signals is similar or identical to the original colorant, and the other(s) output color separation signals are lighter versions of the normal colorant.

In accordance with additional aspects of the disclosure, a color management method for outputting 5 or more (4+) color separation signals to a 5 or more (4+) color print engine is provided. The method includes converting an input source color into intermediate CMYK separation signals using a 4-color management tool; receiving the intermediate CMYK separation signals as input; and outputting at least 5 output color separation signals for reception by a 4+ color print engine. The outputting passes at least one of the input separation signals through as output without transformation, and transforms at least one different one of the input separation signals into two separate output color separation signals that collectively have a same tonal quality. One of the two separate output color separation signals is a normal colorant and the other of the two separate output color separation signals is a light version of the normal colorant.

In a first embodiment, these aspects may be achieved by a 1-D transformation in which one or more of the 4-color separations are split into a blend of light and dark colorants (such as light and dark cyan) based solely on the input value of the single colorant. This may be achieved by a fixed mapping. Remaining colorants are passed directly without change. Thus, color management is broken down into a 4-color intermediary solution, which is then subjected to one or more simple blending transformations for individual colorants. This blending aspect is hidden from the 4-color tools, which are encouraged to solve what appears to be a 4-color problem. A 4+ solution is actually generated due to the hidden blending decomposition which maps at least one colorant into at least 2 colorants.

In a second embodiment, these aspects may be achieved using a 4-D blending scheme in which again the basic color management is broken down into a 4-color intermediary solution, and one or more blending transformations of light and dark colorants. However, rather than being based solely on the individual input colorant level, the blend formulation is based on output values from the other color separations. This embodiment is particularly useful in applications where there exists constraints such as ink-limit, while also maintaining the entire 4-color printer gamut.

BRIEF DESCRIPTION OF THE DRAWINGS

Exemplary embodiments will be described with reference to the attached drawings, in which like numerals represent like parts, and in which.

EMBODIMENTS

Figure 1:
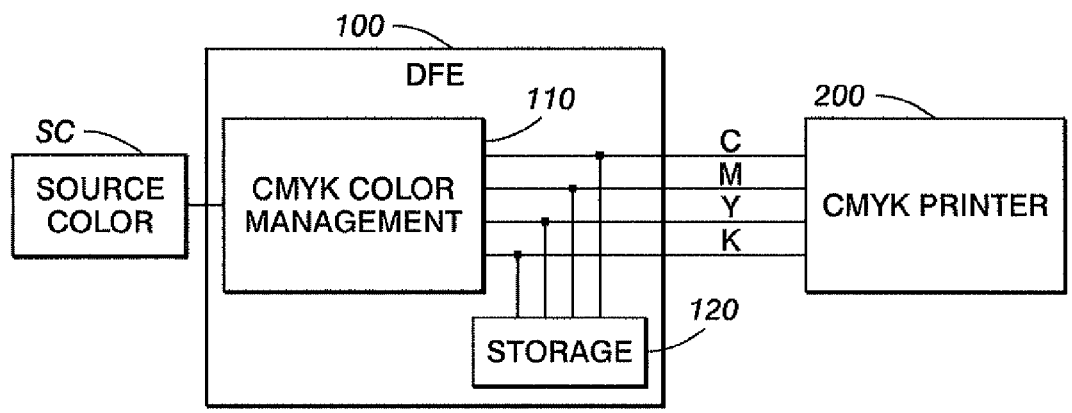
FIG. 1 illustrates a conventional digital front end (DFE) for producing 4-color color management for a 4-color CMYK print engine.

A conventional 4-color management application is illustrated in FIG. 1. Device dependent 4-color output (CMYK) is generated from a source color SC to a device dependent color by a CMYK color management unit 110 within an image processing device serving as a color management system, such as a digital front end (DFE) 100, and sent as four separate color signals C, M, Y and K to a 4-color target print engine 200, such as a xerographic print device. To avoid the need for reprocessing documents, support for "fast reprint" capability may be provided using local storage device 120, which can take any known or subsequently developed form. The fast reprint files are accessible. As a result, the mapping from source color to device dependent color is accessible.

Figure 2:
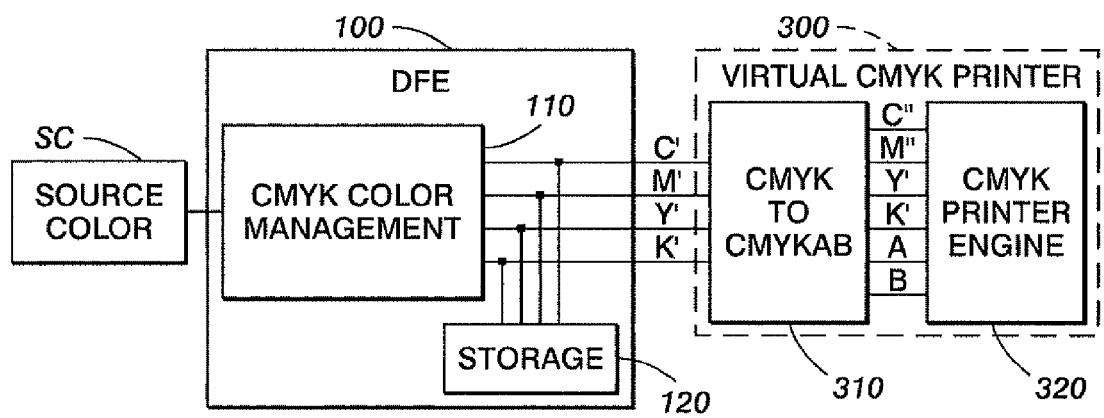
FIG. 2 illustrates the DFE of FIG. 1 as input to a 6-color print engine, which performs its own internal 4-to-6 color mapping within the print engine.

In FIG. 2, consider a 6-color printer 300 that receives a conventional 4-color CMYK video signal output from the DFE 100. These color separations (C'M'Y'K') are internally transformed by the 6-color printer 300 using a fixed mapping (within the printer) into 6-colors for processing by the printer engine, such as standard CMYK and two additional colorants A, B. Such a 6-color printer engine can be described as residing within a "virtual 4-color printer" (V4CP). This is because this type of system accepts a standard 4-color input from the DFE, which can be managed as a traditional 4-color process. Thus, the "hidden" 6-color characteristics of the printer are ignored by the DFE 100 because it is not concerned with the extra colorants.

The two printers referred to in FIG. 1 and FIG. 2 can be the same printer, operating in different modes or may be different. In FIG. 1, the output CMYK signals from the DFE 100 are used directly as an input, and the additional colors are set to 0. In FIG. 2, the CMYK to 6-color mapping is fixed and set by the printer, with the additional colors called A and B.

Note that using the same 4-color management tools, DFE 100 may develop different color profiles and device dependent CMYK for this 6-color mode. This is suggested by referring to the DFE output as C'Y'M'K' in FIG. 2. These differences may be easily detected by examining the fast-reprint documents in local storage 120. Alternatively, a logic analyzer or an analysis of print samples could be used to determine the CMYK to CMYKAB mapping. However, as far as the DFE is concerned, the 6-color printer 300 may be treated as if it were a 4-color printer because no additional processing is performed by the DFE 100. That is, the existence of the mapping from 4 to 6 colors can be ignored by DFE 100 because it is being performed by the 6-color printer engine within the color printer 300.

Figure 3:
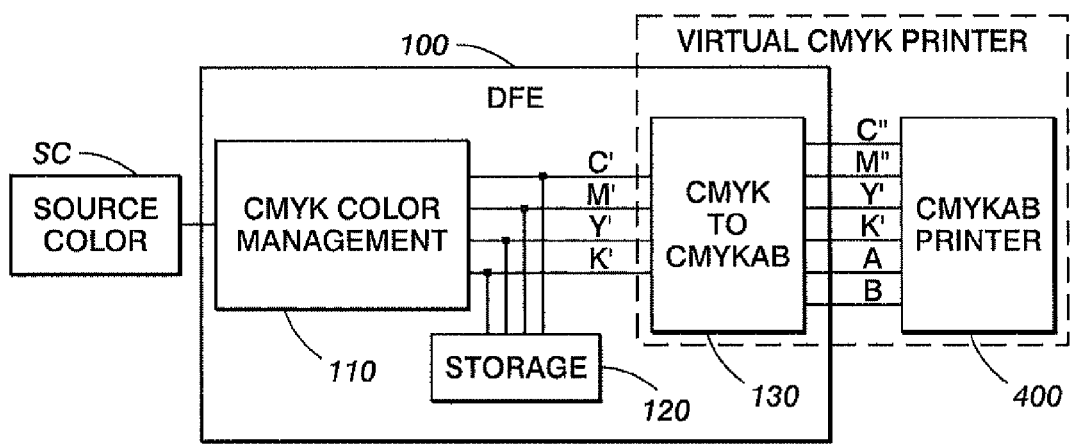
FIG. 3 illustrates a DFE in which 4-color output is used as an intermediary to generate a 6-color mapping within the DFE for output to a 6-color print engine, with distributed parts of this configuration comprising a virtual 4-color printer.

Aspects of the disclosure will be described with reference to FIG. 3. In this embodiment, DFE 100 generates a four color intermediate color output (such as CMYK) from a source color SC and uses this output as an intermediary. Then, this 4-color output is mapped into 5 or more colors by a 4+ color transformation unit 130, such as the 6-color transformation unit shown, within the DFE 100 to drive a 6-color print engine 400 by output of 6-color separation signals from DFE 100 (C"M"Y"K"AB). The 4-to-6 color transformation and 6-color printer engine cascade may be split across two devices. Nevertheless, this cascade can be treated as a virtual printer and treated using conventional 4-color tools. An advantage of this technique is the relative ease with which the intermediary color output (such as CMYK) can be generated using existing, conventional color management tools, and the relative ease with which the subsequent 4-to-6 mapping can be constructed.

In one embodiment, light cyan and light magenta are the two additional colors, paired with dark cyan and dark magenta, respectively. However, other combinations of light and dark colorants may be used, such as dark and light black (gray) or dark and light yellow. Also, the systems and methods are not limited to the addition of two extra colorants, but may include a 5 or more color system in which at least one extra colorant is added.

The black and yellow colorants, and the GCR strategy, are determined using conventional 4-color management methods. For example, a simple implementation of this may be seen in FIG. 4 where from the intermediate CMYK separation signals generated by the DFE, the black and yellow separations K and Y are retained and directly passed as output. However, the cyan and magenta color separations C and M are each individually decomposed into tone dependent light and dark blends using fixed transformations $T_C$ and $T_M$, respectively In this embodiment, the decompositions do not depend on either the yellow or black color levels. Thus, this embodiment uses a 1-D blending method in which a single variable (individual cyan or magenta input tone level) is used for the blending.

Figure 5:
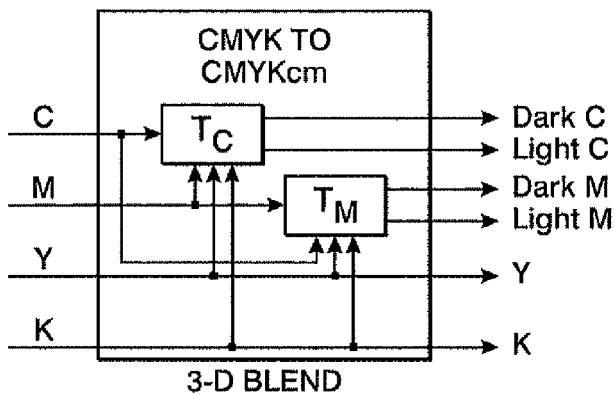
FIG. 5 illustrates a simple diagrammatic representation of 4-to-6 color transformation using a 4-D blending method according to the disclosure.

In another embodiment shown in FIG. 5, light cyan and light magenta are again the two additional colors, paired with dark cyan and dark magenta, respectively. Again, other combinations of light and dark colorants may be used, and there may be any number of colorants added.

The black and yellow colorants, and the GCR strategy, are determined using conventional 4-color management methods and the intermediate black and yellow separations K and Y are retained and directly passed as output as in the prior example. However, the cyan and magenta color separations C and M are each individually decomposed into tone dependent light and dark blends using transformations $T_C$ and $T_M$, respectively, that are based on the output levels for the other colorants. This embodiment thus uses a 4-D blending method with four variables (levels of all input color separations C, M, Y and K are used). Thus, the blend of light to dark cyan is based not only on the tone level of cyan, but also on the levels of the other color separation signals M, Y and K. This allows for an adjustment of a blend ratio to factor in quantities of other colorants used.

Several advantages can be attained by use of additional colorants in the above examples. While small amounts of dark colorant can express a light color by use of low area coverage, image quality can be improved by substituting a higher area coverage of a lighter colorant for light regions. This can improve the smoothness of the appearance, at the expense of increased print material usage.

However, one potential problem with this strategy is the interaction between ink-limit and gamut. In many color printer or xerographic systems, there is a defined ink-limit that represents a maximum acceptable total print area coverage for individual pixels of an image. It is often expressed as a percentage of coverage, such as 280%. In a single color printer, area coverage cannot exceed 100% in a single pass. However, with a 4-color printer (CMYK), each colorant may be laid down at each pixel to define a composite image.

Thus, there is the possibility of up to 400% area coverage if each of the cyan, magenta, yellow and black colorants is used in the blended composite image. Certain problems exist, however, in the printing of toner or ink that is applied too thick. For example, a common problem is excessive stress on the downstream fishing system due to the excessive toner pile height for certain colorant combinations. This may cause smearing, among other problems, due to an inability to adequately fuse, dry and transport the overly thick print area coverage.

However, by designing an ink-limit into the color management scheme, such as 280%, color management tools have restricted usage of undesirable combinations of colors that exceed this threshold limit. This may result in a reduction in gamut because all color combinations will not be possible for that printer. Thus, while all combinations of CMYK area coverage values that sum to levels below a particular printer's ink-limit are in-gamut and are reproducible, others that exceed the ink-limit are considered out-of-gamut and will not be reproduced.

Figure 4:
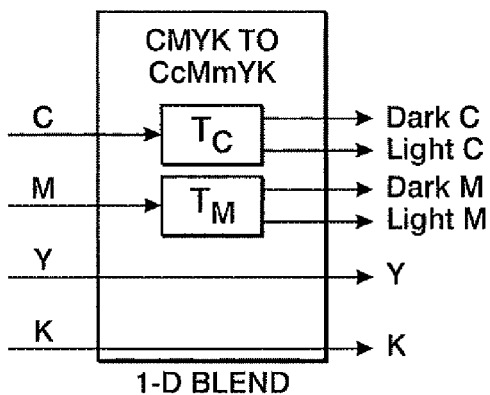
FIG. 4 illustrates a simple diagrammatic representation of 4-to-6 color transformation using a 1-D blending method according to the disclosure.

Mapping cyan (and magenta) into blends of dark and light cyan (and magenta) can only increase area coverage due to the extra possible combinations of colorants. That is, by going from a 4-color system to a 6-color system, the potential area coverage increases from 400% to 600% because more layer combinations are possible. In FIG. 4, the blending uses fixed transformations Tc and Tm. Clearly, area coverage can only increase by replacing light colorant for dark. Later we will show that loosing gamut due to ink limit in an attempt to improve print quality can be avoided using the exemplary method of this disclosure, illustrated in FIG. 5. As a result, 4-color combinations that are within gamut as determined by 4-color management tools may possibly map into 6-color combinations that exceed the ink-limit, and are therefore out-of-gamut. Thus, fixed blending transformations as shown in FIG. 4 require a compromise between light colorant usage and gamut loss due to ink-limit violations.

For example, consider using blends of light cyan and cyan or light magenta and magenta on flesh-tone, sky, and ocean areas. In flesh tone regions, the largest source of additional area coverage comes from magenta where, for example, 60% dark magenta input may be replaced with a blend of 85% light magenta and 25% dark magenta for a 6-color system. Sky regions are dominated by cyan, and in a 6-color system, 65% dark cyan may be replaced with a blend of 80% light cyan and 45% dark cyan. For ocean regions, both of these blending substitutions are required. For flesh-tone and sky, the area coverage increases but their totals remains below the ink-limit. However, for ocean, the change in area coverage goes beyond the ink-limit, and therefore that color is out of gamut. For a color system, this is the worst type of gamut loss. This type of gamut loss punches out holes from within the gamut volume. Gamut loss that simply trims off slices along gamut volume edges are much easier to contend with because the adjusted gamut remains convex.

Figure 6:
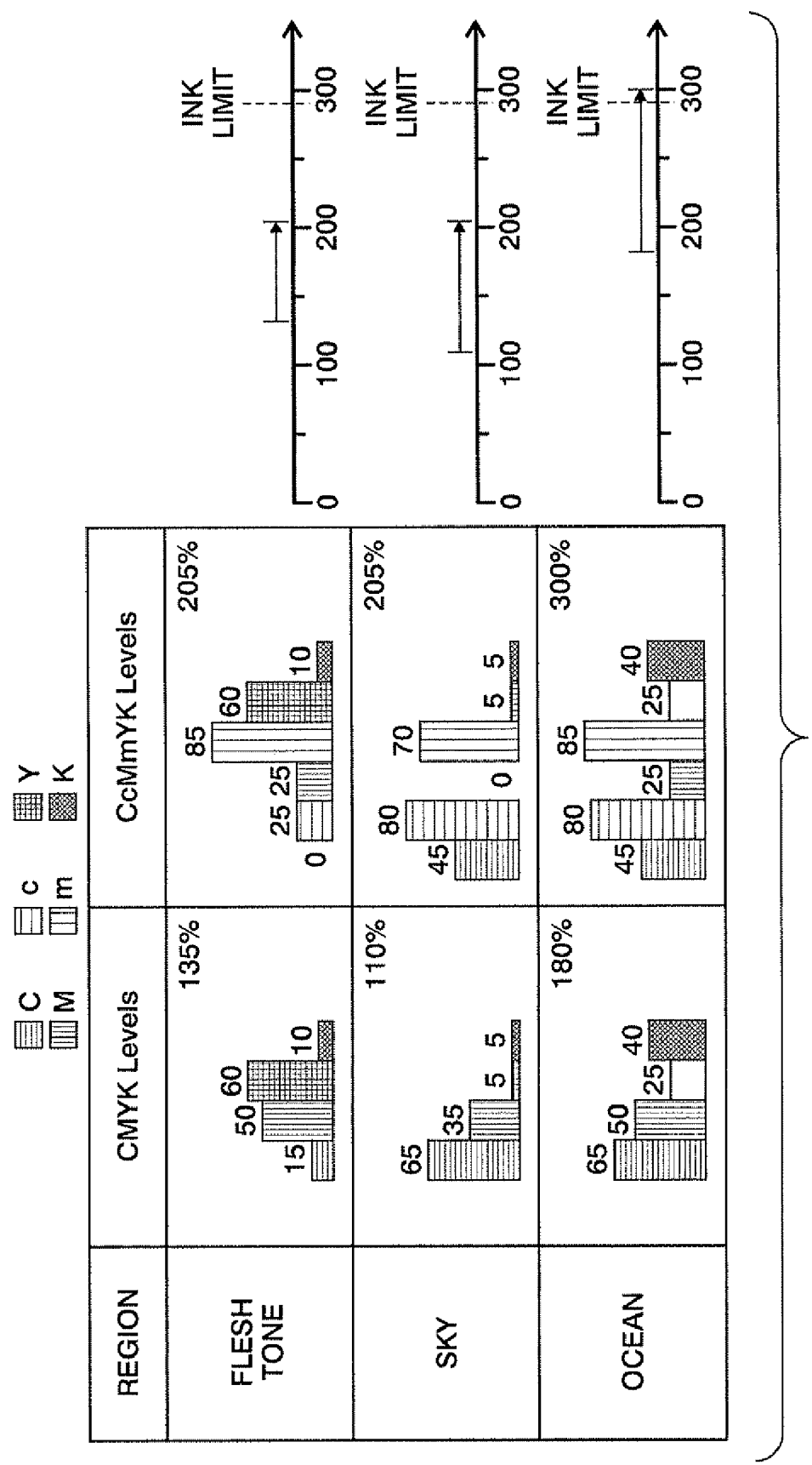
FIG. 6 illustrates a table showing colorant combination totals for various rendered objects using 4 and 6 color print systems, respectively, with the arrows to the right of the table showing a composite of the total ink levels relative to a machine-dependent ink limit.

For example, as shown in FIG. 6, different regions of an image representing flesh tone, sky and ocean regions are rendered using a combination of 4 or 6 colorants as shown. Flesh tone may be rendered using the chosen combination of colorants in a 4-color system resulting in an ink coverage value of 135%. The same color reproduced using a 6-color system with a typical blend transformation may result in an increased ink coverage value of 205%. This increase is shown to the right of the chart. Although this level may be well within an exemplary design ink-limit of 280%, it represents a significant increase of over 50% area coverage due to the additional two colorants. Similarly, sky region coverage may expand from 110% to 205% when switching from a 4-color system to a 6-color system. Certain dark regions, such as ocean regions, have a substantially high ink coverage value of 180%, even in the 4-color system. However, the exemplary 6-color representation of an ocean region would result in an ink coverage area of 300%, which exceed the exemplary design constraint of 280% for the ink limit. Thus, this particular color would violate the ink limit under the exemplary fixed blend transformation and is considered out-of-gamut. Accordingly, this particular ocean color would not be reproducible in a 6-color print engine. Scaling back of the blend ratio can decrease the severity of the problem, but not eliminate this trade-off. Any fixed blending method that operates on individual separations and increases area coverage will cause some gamut loss.

Figure 7:
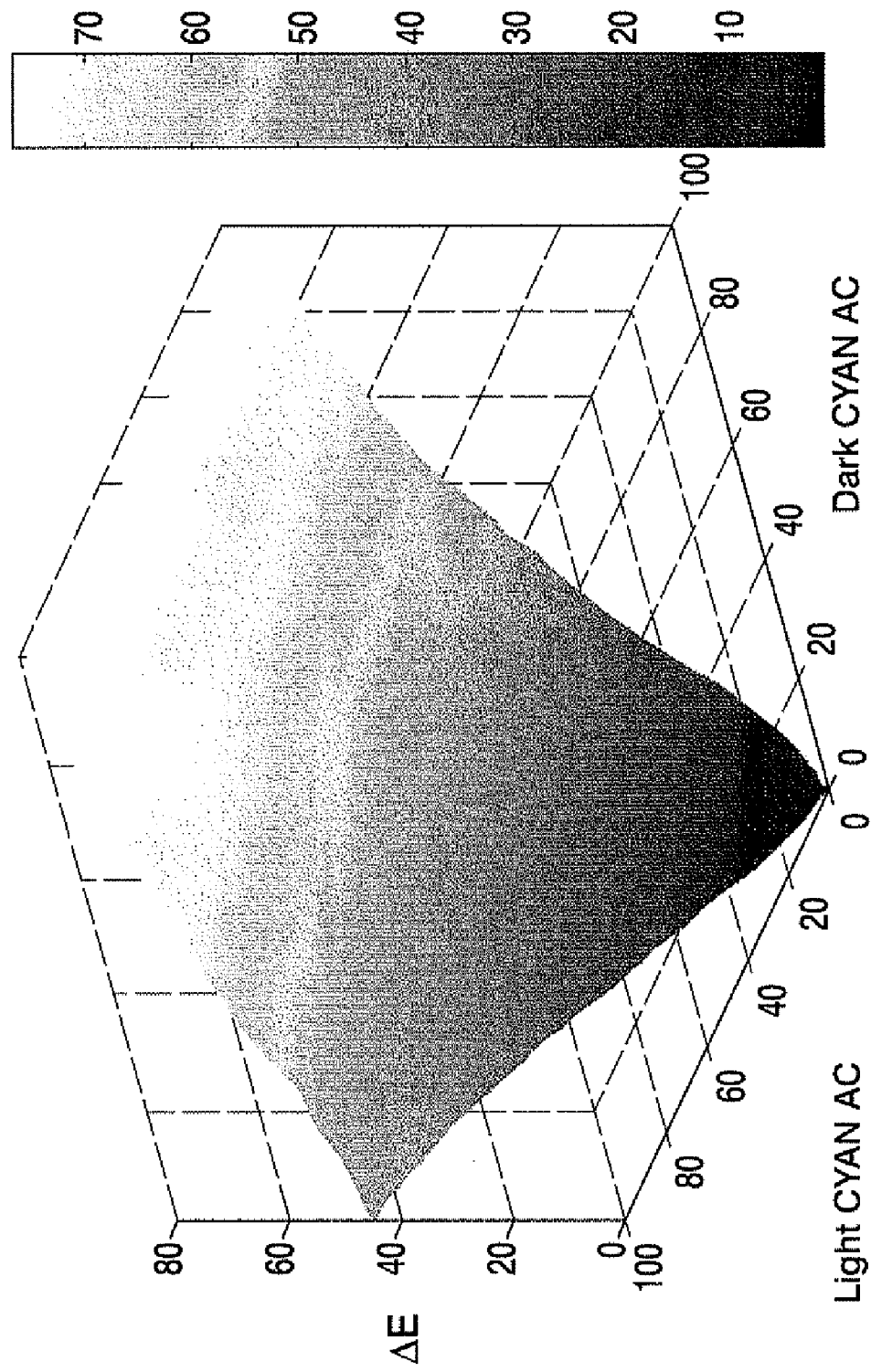
FIG. 7 illustrates a 3-D $\Delta E$ from paper measured as a function of all possible blends of light and dark colorant.

FIG. 7 shows the visual effect of possible blends of light and dark cyan (from 0-100% coverage). This is alternatively shown in the two-dimensional graphs of FIGS. 8-9. Thus, the possible blending transformation TC and TM of FIG. 4 can be detailed using 1-D mapping curves shown in FIG. 8 or 9.

Figure 8:
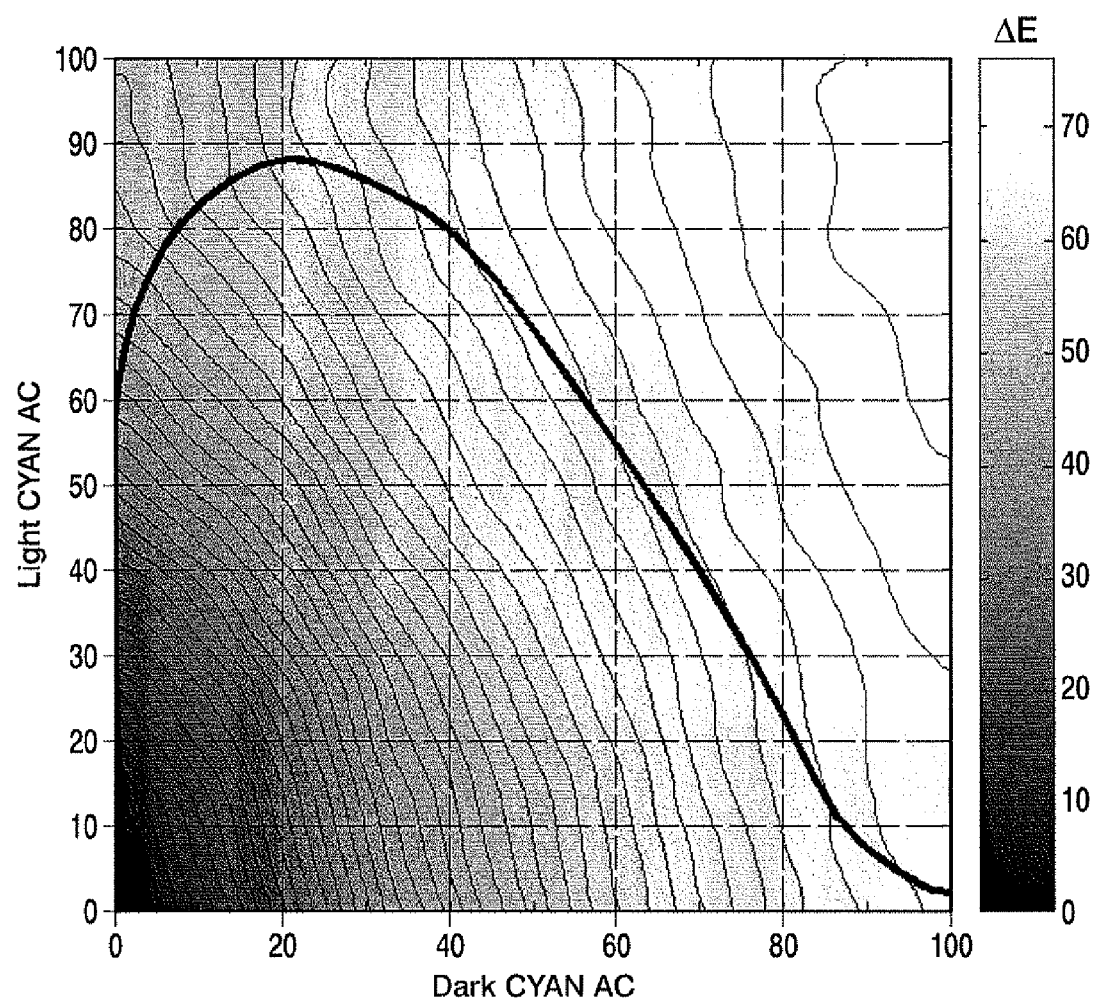
FIG. 8 illustrates a contour diagram illustrating $\Delta E$ from paper versus light and dark colorant with an exemplary blending curve in accordance with a first embodiment.
Figure 9:
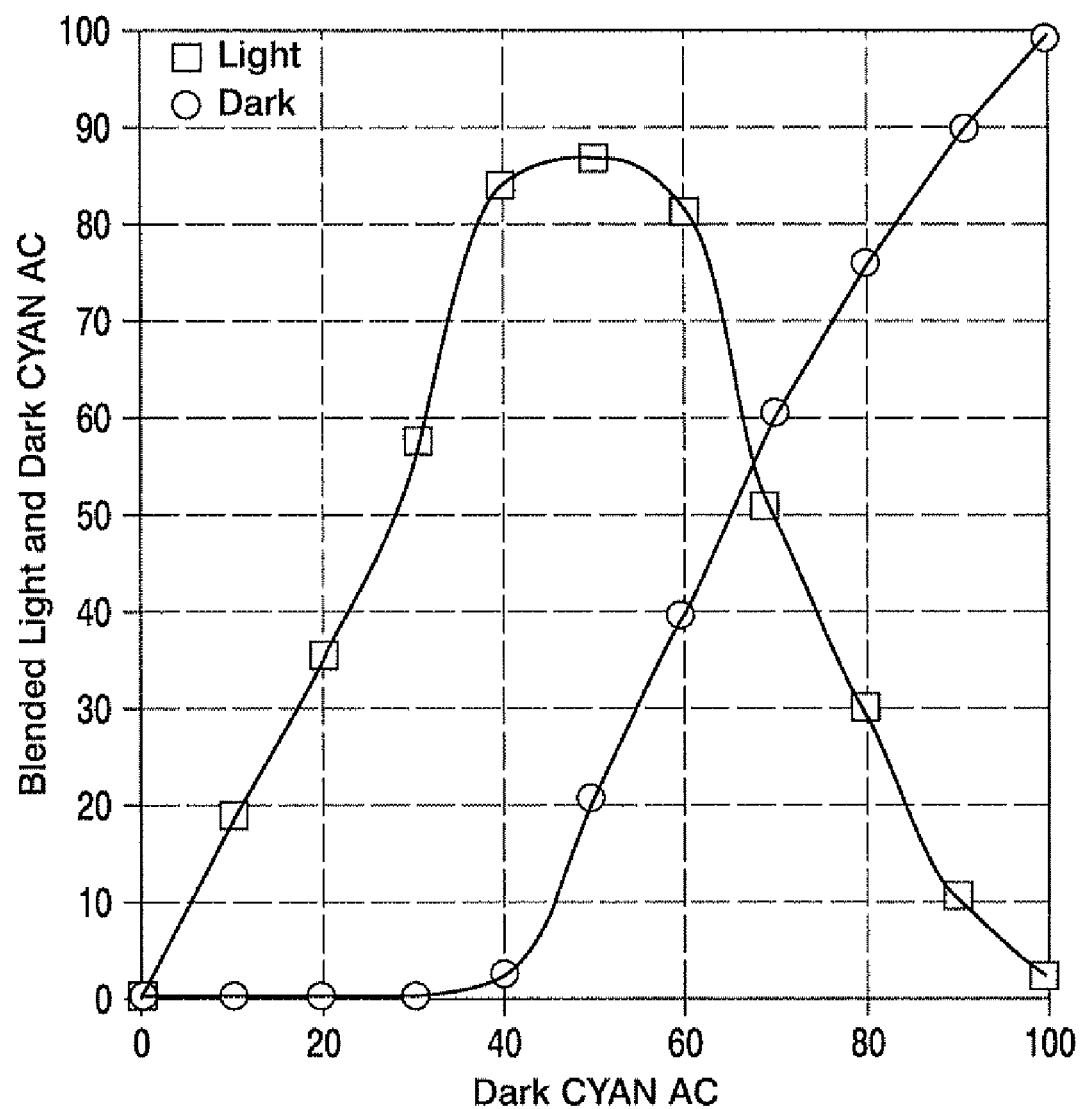
FIG. 9 illustrates a decomposition of the blending curve of FIG. 8, into separate dark and light components.

Mapping from the original cyan into a light and dark blend is illustrated by FIG. 8 within the light-cyan vs. dark-cyan space. The curve must move along a path of monotonically increasing contours of delta E from paper, as shown. The same mapping is shown in FIG. 9, where the mapping is illustrated as two 1-D plots that map dark cyan into light and dark versions. In the highlight region, only light cyan is used while in the shadows, light cyan usage decreases as dark cyan usage increases. A transition takes place within the mid-tone interval. For magenta, similar blending curves are used. The decomposition curves of FIG. 9 can be implemented by the architecture described in FIG. 4. An individual separation is blended into two or more components without taking into account other separations or potential ink-limit faults.

A desirable blending curve is a smooth continuous path that intersects adjacent contour lines. It is important to note that the area between contour lines represent blend combinations resulting in equal tonal quality. For example, 35% light coverage corresponds to about 20% dark coverage, with various blend ratios of the two also exhibiting this tone. However, crossing the contour line results in a change in tone. Thus, the curve shown progresses from light to dark as you move from left to right along the curve. To prevent gamut loss, the blending curve chosen would be a moderately aggressive blend that uses sufficient light colorant to increase smoothness and area coverage, yet avoids ink-limit violations and loss of gamut.

In another embodiment involving light cyan and magenta, gamut loss due to ink-limit constraints is completely avoided while allowing for an aggressive blending with high light colorant usage. To achieve this, a variable amount of blending is applied using a modified 4-to-6 mapping is used. The decision on how to blend cyan and magenta are made together, and before that decision is made, information about the amount of yellow and black is taken into account. This new 4-to-6 mapping methodology is illustrated in FIG. 5. The exact same output generated by the 1-D mapping of FIG. 8 could be generated by the approach shown in FIG. 4 or 5. However, only the method of FIG. 5 can behave differently in regions of the color space where the ink-limit constraints are stressed (neighboring regions are likely to be impacted in order to achieve a smooth transition), and reduce the blend as needed to avoid an ink-limit violation The 4-to-6 color transformation of FIG. 5 maps dark cyan (and magenta) into a blend of light and dark versions of cyan (and magenta). To avoid gamut loss due to the ink-limit, the levels of area coverage of yellow and black are inspected prior to blending to assess total area coverage. A less aggressive blend is employed if necessary to avoid ink limit constraint violations, while more aggressive blending may be used in less stressful regions of the gamut. In this way, the V4CP approach hides complex aspects of the 6-color problem from the 4-color management tools. This permits 4-color tools to complete the most difficult parts of color management, and produce 6-color strategies that avoid gamut loss.

Figure 10:
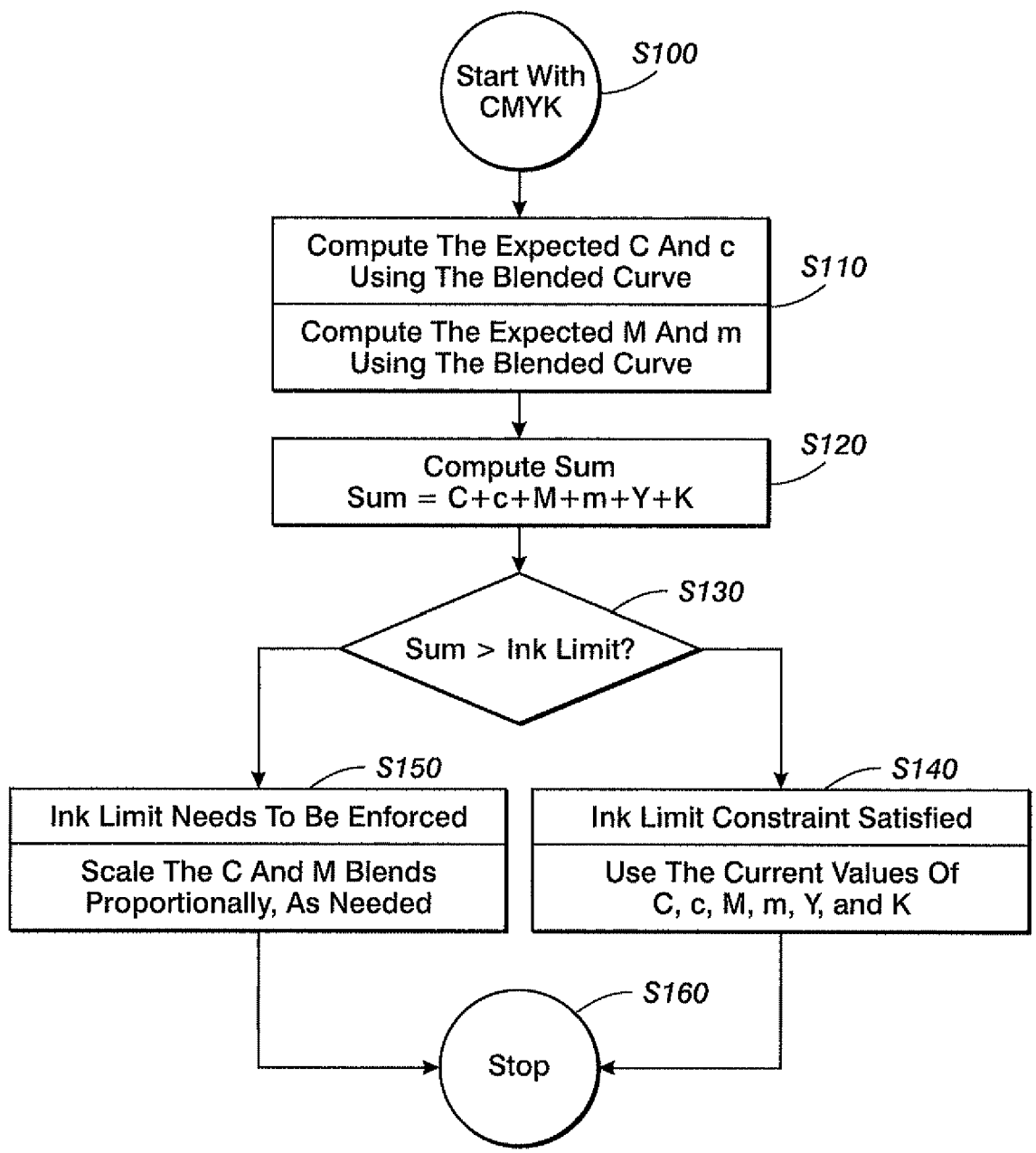
FIG. 10 illustrates a flow chart showing a process for adjusting a blending curve using the color transformation of FIG. 5 to optimize output quality while staying within ink limits to avoid gamut losses.

The behavior of the 4-D $T_C$ and $T_M$ mapping of FIG. 5 often behaves exactly like the 1-D mappings $T_C$ and $T_M$ of FIG. 4. First, consider the output of the 1-D blending procedure. If the output is well within the ink limit, it is used directly. Therefore, black and yellow can be ignored, and the diagram shown in FIG. 5 behaves exactly like the diagram of FIG. 4. However, in those areas of the gamut where the ink limit is violated (or close to being violated), the blending strategy can be reduced to guarantee that the output conforms to the ink limit constraint. In this way, an aggressive blending strategy can be employed throughout sky, flesh-tone, and most other regions of the gamut, without losing any gamut volume. A flow diagram detailing these steps is provided in FIG. 10.

The process starts at step S100 where CYMK color separations are provided from a 4-color management tool within the DFE. From these intermediate values, flow advances to step S110 where expected dark and light colorant values are computed for each of cyan and magenta. This may be done using a lookup table containing a mapping corresponding to the upper curve in FIGS. 11, which is an aggressive curve with large light colorant coverage.

From step S110, flow advances to step S120 where the total sum of all colorants is computed. At step S130, this sum is compared with the defined ink-limit for the particular system, such as 280%. If the sum is well below the limit, flow advances to step S140 where the ink-limit is satisfied and the current values of colorants are used. However, if the sum is above the ink-limit, flow advances to step S150 where the blends are scaled down proportionally, as needed, to satisfy the ink-limit. This may be achieved, for example, by dropping to a lower curve in the FIG. 11 chart. As mentioned previously, various combinations of colorant blends between contour lines can achieve the same tonal output. Thus, each of the 5 exemplary blend curves shown produce the same output. However, each will result in different area coverage and image quality, with the more aggressive curves having more smoothness at the expense of higher print supply usage. From steps S140 and S150, the process stops at step S160.

Figure 11:
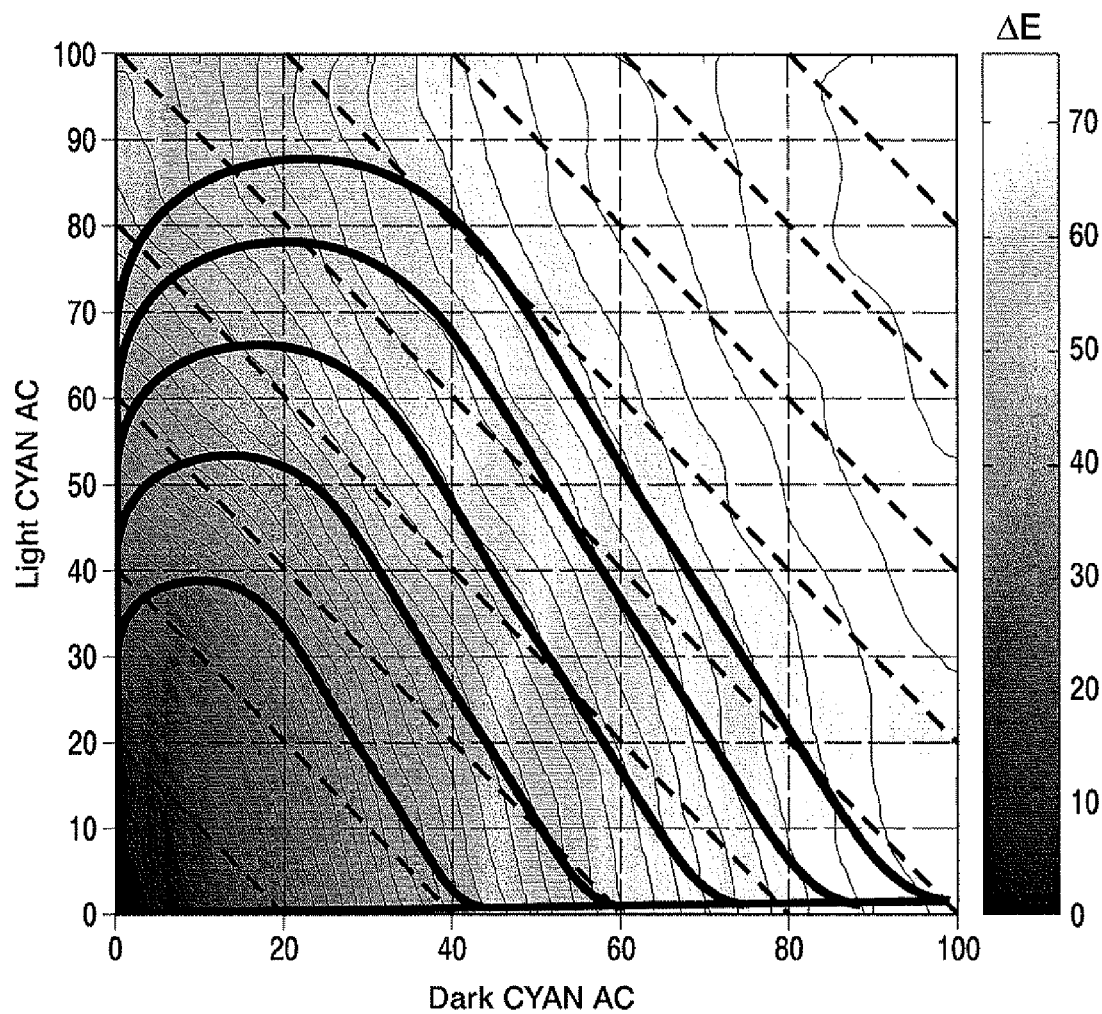
FIG. 11 illustrates a chart showing a series of scaled blending curves for use with the 4-D blending process of FIG. 10.

As an example, consider using the upper blending curve of FIG. 11 to replace 50% magenta and 65% cyan with blends. Along a contour of constant ΔE from paper, 50% dark magenta can be shown to be identical to a blend of 85% light magenta and 25% dark magenta. Similarly, 65% dark cyan can be replaced with a blend of 80% light cyan and 45% dark cyan. If the ink limit is exceeded, the blending curves can be replaced with a less aggressive curve, such as a lower curve in FIG. 11. Now, 50% dark magenta can be replaced with a blend of 78% light magenta and 20% dark magenta. Similarly, 65% cyan can be now replaced with a blend of 57% light cyan and 48% dark cyan. By switching to the less aggressive blending curves, the total area coverage has been reduced by 32% (85+25+80+45−78−20−57−48). In this way, the blending curves can be adjusted as needed to avoid ink-limit problems. In the worst case, blending may be disabled completely, permitting use of dark cyan and dark magenta only. This strategy can be used to guarantee that there is no decrease in gamut as the machine is switched from 4-color into 6-color mode. Also, by using an aggressive curve as a default, maximum image quality smoothness can be obtained, until ink-limit violations are encountered.

To exploit the virtual 4-color printer method of the disclosure, the color management task will be broken down into three stages of activity. These stages can be described as follows:

The first stage of the color management process is a 4-color intermediary solution. This can be solved using conventional 4-color tools. Light cyan and magenta colors are not used, and a 4-color CMYK solution is generated. Note that this is not a wasted effort. Products that use more than 4 colors often support a 4-color mode (to reduce consumables and/or improve productivity). Therefore, the 4-color solution is typically already a program requirement. In this stage, the redundancy associated with CMYK printing is solved using matured GCR tools rather than a higher level, complicated 6-color management tool.

The second stage is a 4-to-6 color transformation. Its output is intended to produce roughly the same appearance suggested by the previously computed CMYK intermediary. A perfect match is unlikely, and also unnecessary. However, the mapping from CMYK to CcMmYK should be smooth and well behaved (e.g., small differences in CMYK input should correspond to small differences in CcMmYK output). For most CMYK combinations, a 1-D mapping of cyan and magenta into blends can be performed. If the ink limits are violated, the blending curve can be reduced to avoid gamut loss.

Typically, a small set of points are used to interpolate all possible CMYK values. Each and every point within this set is assigned CcMmYK values that are ink-limit compliant. This aspect of the color management task is computed off-line, and the results may be loaded into look-up-tables.

In the third stage, all CMYK values can now be transformed into CcMmYK values using the mapping method generated in stage 2. This mapping is held constant. The cascade of the 4-to-6 mapping and 6-color printer behave as a V4CP. The mature 4-color management tools used in stage 1 are now reused. In this way, any physical interactions between colorants that produce unanticipated color shifts can be compensated for. This stage does not require new color management tools.

Using the three stage method, corrections can be applied to compensate for any hue deviations between light and dark cyan (and between light and dark magenta). The hue shifts associated with blending are buried within the V4CP. The 4-color management tools are designed to accommodate printers with physical interactions between colors, and may naturally generate adjusted intermediary CMYK values as needed. This will largely compensate for the hue shifts associated with blending. In general, stage 2 and 3 can then be iterated. In this way, further refinements can be made to the 4-to-6 mapping, followed by fine-tuning adjustment of the CMYK intermediary.

It should be understood that the DFE 100 or portions thereof can be implemented in software in a suitably programmed general purpose computer. Alternatively, portions thereof may be implemented as physically distinct hardware circuits within an ASIC, or using a FPGA, a PDL, a PLA or a PAL, or using discrete logic elements or discrete circuit elements.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An image forming device including a 5 or more color management system for outputting 5 or more color separation signals to a 5 or more color print engine in the image forming device, the system comprising:
   an image source;
   a 4-color management unit that converts an input source color obtained from the image source into virtual intermediate CMYK separation signals;
   a 5 or more color transformation unit that receives the virtual intermediate CMYK separation signals as inputs and outputs at least 5 output color separation signals for reception by the 5 or more color print engine, wherein the 5 or more color transformation unit
      passes at least one of the input separation signals through as at least one of the output color separation signals without transformation,
      transforms at least one different one of the input separation signals into two or more separate output color separation signals that collectively have a same tonal quality, one of the two or more separate output color separation signals being a normal colorant and at least one other of the separate output color separation signals being a light version of the normal colorant,
      computes a total sum of colorants,
      compares the total sum of the colorants to a predetermined threshold, and
      when it is determined the predetermined threshold is exceeded from the comparison, scales down a blend of the colorants represented by the separate output color signals proportionately so that the total sum of the colorants is below the predetermined threshold,
   wherein the 5 or more color print engine outputs an output image based on the at least 5 output color separation signals.

2. The image forming device according to claim 1, wherein the predetermined threshold is based on an ink-limit requirement of the 5 or more color print engine.

3. The image forming device according to claim 1, wherein the transformation is based only on the one different one of the input separation signals.

4. The image forming device according to claim 1, wherein the transformation is based on the one different one of the input separation signals and a computed total sum of the separation signals.

5. The image forming device according to claim 4, wherein multiple blending curves are available and the transformation unit selects a blending curve that avoids an ink-limit violation.

6. The image forming device according to claim 1, wherein the Y and K separation signals are passed through without transformation.

7. The image forming device according to claim 1, wherein the C and M separation signals are each transformed.

8. A 5 or more color management method for outputting 5 or more color separation signals to a 5 or more color print engine in an image forming device, the method comprising:
   obtaining an input image;
   converting an input source color from the obtained input image into virtual intermediate CMYK separation signals using a 4-color management tool;
   receiving the virtual intermediate CMYK separation signals as inputs; and
   outputting at least 5 output color separation signals for reception by a 5 or more color print engine, the outputting
      passing at least one of the input separation signals through as at least one of the output color separation signals without transformation, and
      transforming at least one different one of the input separation signals into two or more separate output color separation signals that collectively have a same tonal quality, one of the two separate output color separation signals being a normal colorant and at least one other of the separate output color separation signals being a light version of the normal colorant,
      computing a total sum of colorants,
      comparing the total sum of the colorants to a predetermined threshold, and
      determining when the predetermined threshold is exceeded, and scaling down a blend of the colorants represented by the separate output color signals proportionately so that the total sum of the colorants is below the predetermined threshold, and
   printing an output image with the 5 or more color print engine based on the at least 5 output color separation signals.

9. The method according to claim 8, wherein the transformation uses a blending curve that maximizes light colorant usage while maintaining the full gamut achievable by the virtual intermediate CMYK separation signals.

10. The method according to claim 8, wherein the predetermined threshold is based on an ink-limit requirement of the 5 or more color print engine.

11. The method according to claim 10, wherein multiple blending curves are available, and the method further comprises selecting one of the multiple blending curves that avoids an ink-limit violation.

12. The method according to claim 8, wherein the transformation is based only on the one different one of the input separation signals.

13. The method according to claim 8, wherein the transformation is based on the one different one of the input separation signals and a computed total sum of the separation signals.

14. The method according to claim 8, wherein the outputting passes the Y and K separation signals through without transformation.

15. The method according to claim 8, wherein the outputting passes the C and M separation signals through with transformation.

16. A non-transitory computer-readable storage medium storing a program of instructions executable by a computer to perform a function for image processing to transform a source color into 5 or more color separation signals, the function comprising:

converting an input source color into virtual intermediate CMYK separation signals using a 4-color management tool;

receiving the virtual intermediate CMYK separation signals as input; and outputting at least 5 output color separation signals for reception by a 5 or more color print engine, the outputting passing at least one of the input separation signals through as at least one of the output color separation signals without transformation, and transforming at least one different one of the input separation signals into two or more separate output color separation signals that collectively have a similar tonal quality, one of the two or more separate output color separation signals being a normal colorant and at least one other of the separate output color separation signals being a lighter version of the normal colorant, computing a total sum of colorants, comparing the total sum of the colorants to a predetermined threshold, and determining when the predetermined threshold is exceeded, and scaling down a blend of the colorants represented by the separate output color signals proportionately so that the total sum of the colorants is below the predetermined threshold.

17. The storage medium according to claim 16, wherein the predetermined threshold is based on an ink-limit requirement of the 5 or more color print engine.

18. The storage medium according to claim 17, wherein multiple blending curves are available, and the function further includes selecting one of the multiple blending curves that avoids an ink-limit violation.

\* \* \* \* \*